United States Patent
Naqvi

(10) Patent No.: US 11,625,461 B2
(45) Date of Patent: Apr. 11, 2023

(54) METHOD AND SYSTEM FOR SAFEGUARDING STORED DATA

(71) Applicant: Sensoriant, Inc., Cedar Knolls, NJ (US)

(72) Inventor: Shamim A. Naqvi, Morristown, NJ (US)

(73) Assignee: Sensoriant, Inc., Morristown, NJ (US)

( * ) Notice: Subject to any disclaimer, the term of this patent is extended or adjusted under 35 U.S.C. 154(b) by 388 days.

(21) Appl. No.: 15/352,861

(22) Filed: Nov. 16, 2016

(65) Prior Publication Data

US 2017/0293747 A1    Oct. 12, 2017

Related U.S. Application Data

(60) Provisional application No. 62/355,290, filed on Jun. 27, 2016, provisional application No. 62/321,302, filed on Apr. 12, 2016.

(51) Int. Cl.
| | | |
|---|---|---|
| *G06F 21/31* | (2013.01) | |
| *G06F 21/60* | (2013.01) | |
| *G06F 21/62* | (2013.01) | |

(52) U.S. Cl.
CPC .......... *G06F 21/316* (2013.01); *G06F 21/604* (2013.01); *G06F 21/6218* (2013.01)

(58) Field of Classification Search
CPC ... G06F 21/316; G06F 21/6218; G06F 21/604
See application file for complete search history.

(56) References Cited

U.S. PATENT DOCUMENTS

| | | | |
|---|---|---|---|
| 8,498,941 B2 | 7/2013 | Felsher | |
| 10,318,747 B1* | 6/2019 | MacCárthaigh | .... H04L 63/0428 |
| 10,470,043 B1* | 11/2019 | Cherala | ............... H04L 63/0861 |
| 2009/0132828 A1 | 5/2009 | Kiester | |
| 2009/0287837 A1* | 11/2009 | Felsher | ................. G06F 19/328 |
| | | | 709/229 |
| 2009/0319058 A1 | 12/2009 | Rovaglio | |

(Continued)

OTHER PUBLICATIONS

Ronghui Gu, "CertiKOS: An Extensible Architecture for Building Certified Concurrent OS Kernels" Proceedings of the 12th USENIX Symposium on Operating Systems Design and Implementation (OSDI '16). Nov. 2-4, 2016 Savannah, GA, USA, 19 pages.

(Continued)

*Primary Examiner* — Joseph P Hirl
*Assistant Examiner* — Thomas A Gyorfi
(74) *Attorney, Agent, or Firm* — Stuart H. Mayer; Mayer & Williams PC

(57) ABSTRACT

A method and system for accessing stored data includes receiving a request to access data stored in a data storage unit. The request requires one or more data operations to be performed by a system having access to the stored data. Responsive to the data request, one or more locks are derived and assigned to one or more of the data operations. Each of the locks control invocation of the data operations to which the respective lock is assigned. The deriving is based in part on (i) user context data obtained from a user issuing the request and (ii) data context comprising one or more attributes of the request. Each of the one or more locks is unlocked and the one or more data operations are invoked after the one or more locks are unlocked.

25 Claims, 19 Drawing Sheets

(56) References Cited

U.S. PATENT DOCUMENTS

| | | | |
|---|---|---|---|
| 2011/0231913 A1* | 9/2011 | Feng | G06F 21/46 |
| | | | 726/7 |
| 2011/0277025 A1 | 11/2011 | Counterman | |
| 2014/0068735 A1* | 3/2014 | Marinov | H04L 63/08 |
| | | | 726/7 |
| 2014/0289821 A1 | 9/2014 | Wilson | |
| 2014/0335824 A1 | 11/2014 | Abraham | |
| 2015/0244690 A1* | 8/2015 | Mossbarger | H04L 9/3263 |
| | | | 713/171 |

OTHER PUBLICATIONS

Byun et al. Purpose based access control of complex data for privacy protection . SACMAT'05, 1-31 Jun. 1-3, 2005, Stockholm, Sweden. [retrieved on Feb. 22, 2017]. Retrieved from Google Scholar: <URL: https ://www .cs. purd ue. edu/homes/ninghui/ papers/purpose sacmat05. pdf>. pp. 1-9.

International Search Report and Written Opinion dated Apr. 25, 2017 issued in connection with corresponding International Application No. PT/US2016/062202 (14 pages total).

Heung Youl Youm Soonchunhyang University Korea (Republic Of): "A proposal for the 3rd revised text for RecommendationITU-T X.sap-8: Efficient multi-factor authentication mechanisms using mobile devices;C xx", ITU-T Draft; Study Period 2013-2016, International Telecommunication Union, Geneva; CH, vol. 7/17, Jan. 2, 2014.

Lus Miranda et al: "Context-aware multi-factor authentication", Repositorio Institucional da FCT-UNL, Sep. 24, 2010.

\* cited by examiner

Legend:
　　Relation split into 5 shards

| ?Pri(Alice) | Pub(Alice) | Private Key Lock | Operation R |
|---|---|---|---|

FIG. 4A

| ?Pri(Alice) | Private Key Lock | Operation R |
|---|---|---|

FIG. 4B

| ?Pri(Alice) | ?Pri(Charlie) | Private Key Lock | Operation R |
|---|---|---|---|

FIG. 4C

| User 1 | wifi-1 | Wifi-2 | Bluetooth-1 |
|---|---|---|---|
| Average time/day | 6 hours | 8 hours | 30 minutes |

| User 1 | Transition Frequency |
|---|---|
| From wi-fi-1 to wi-fi-2 | 30% |
| From wifi-2 to Bluetooth-1 | 57% |

FIG. 5

| Daily Freq | Match score | Target (T) | Encumbrance (E) | Reference |
|---|---|---|---|---|
| <2 | 0-3 | 0000000000xx...x | All nodes | L1 |
| 3-6 | 4-6 | 00xx...x | 3 | L2 |
| >6 | 7-9 | 0xx...x | 1 | L3 |

FIG. 7

| | | |
|---|---|---|
| TE | 1 | User request split into two phases. |
| | 2 | Phase 1: user admission request |
| | 3 | Locked Object ABC: [Private Key Lock, Sensor Lock, Work Lock, Encumbrance Lock | Execute-second-phase] |
| | 4 | Inject Object ABC to EE Network |
| EE sub-network | 5 | Object ABC on FIFO list of all nodes of EE network |
| | 6 | Nodes of the EE network succeed in opening all locks except Encumbrance Lock; Object propagated to VE sub-network. |
| VE sub-network | 7 | Object ABC on FIFO list of all VE sub-network nodes. Nodes of VE sub-network succeed in opening encumbrance Lock. Open Locked Object. |
| | 8 | Execute Guarded operation (second-phase). |

FIG. 8

| 1 | Who is customer John's banker |
|---|---|
| 2 | Get relation Customer |
| 3 | Get shard 1 |
| 4 | Get shard 2 |
| 5 | Union shard 1 & shard 2 |
| 6 | Get relation Branch |
| 7 | Get shard 1 of relation Branch |
| 8 | Get shard 2 of relation Branch |
| 9 | Union shard 1 & shard 2 |
| 10 | Join row 5 with row 9 over Branch# attribute |
| 11 | Project over CustName, BrManager |
| 12 | Select BrManager where CustName = "John" |

Note: It is assumed, as an example, that relations Customer and Branch are split into two shards each.

FIG. 9

| Size of Output (tuples) | Work (Target) | Encumbrance | Reference |
|---|---|---|---|
| 100 | 1-leading Hexadecimal zero | 2 | L11 |
| 100-400 | 2-leading Hexadecimal zeroes | 3 | L12 |
| 40-1000 | 3-leading Hexadecimal zeroes | 4 | L13 |
| >1000 | 4-leading Hexadecimal zeroes | 5 | L14 |

FIG. 10

| %change | Work | Encumbrance | Reference |
|---|---|---|---|
| 1 – 10% | 2 leading zeroes | 2 | L21 |
| 10 – 25% | 3 leading zeroes | 3 | L22 |
| 25- 50% | 4 leading zeroes | 4 | L23 |
| >50% | 5 leading zeroes | 5 | L24 |

FIG. 11

| Deviation from Average | Work | Encumbrance | |
|---|---|---|---|
| 1x | 3 leading zeroes | 2 | L25 |
| 2x | 4-leding zeroes | 3 | L26 |
| 3x | 5 leading zeroes | 4 | L27 |
| >4x | 6 leading zeroes | 5 | L28 |

FIG.12

| 1 | Who is customer John's banker | Associated Contract & Proof of Work |
|---|---|---|
| 2 | Get relation Customer | |
| 3 | Get shard 1 of relation Customer | Create a locked object by choosing the values for the work and encumbrance locks. |
| 4 | Get shard 2 of relation Customer | Create a locked object by choosing the values for the work and encumbrance locks. |
| 5 | Union shard 1 & shard 2 | |
| 6 | Get relation Branch | |
| 7 | Get shard 1 of relation Branch | Create a locked object by choosing the values for the work and encumbrance locks. |
| 8 | Get shard 2 of relation Branch | Create a locked object by choosing the values for the work and encumbrance locks. |
| 9 | Union shard 1 & shard 2 | |
| 10 | Join row 5 with row 9 over Branch# attribute | |
| 11 | Project over CustName, BrManager | |
| 12 | Select BrManager where CustName = "John" | |

FIG. 13

Legend:
- The values of E1-E4 and W1-W4 are chosen by recourse to the tables shown in FIG. 10, 11 and 12.

Notes:
- Propagations within the nodes of the EE sub-network have not been shown.
- The verification of signatures and public keys, etc., have been omitted (discussed earlier).

METHOD AND SYSTEM FOR SAFEGUARDING STORED DATA

CROSS REFERENCE TO RELATED APPLICATION

This application claims the benefit of U.S. Provisional Application Ser. No. 62/321,302, filed Apr. 12, 2016 and U.S. Provisional Application Ser. No. 62/355,290, filed Jun. 27, 2016, the contents of which are incorporated herein by reference.

BACKGROUND

The problem of stored data being vulnerable to unauthorized access and being subjected to malicious changes and manipulations, i.e., attacks, has been known since the early days of computing, i.e., for more than six decades. Scarcely a few weeks or months go by without news of such attacks. Governments, corporations and banks have all reported suffering losses as a result of such attacks. It has been a leading problem that has concerned many computer engineers, security professionals and business leaders. To date no completely secure system and method has been devised to circumvent all such attacks.

BRIEF DESCRIPTION OF THE DRAWINGS

FIGS. 4A, 4B and 4C each show a locked object R locked with a private key.

FIG. 5 shows a summary of environmental data of a user averaged over one week, which may be used to generate template data that may be used to authenticate a user.

FIG. 7 shows a table of data values that may be used to determine the importance of a user request from which the amount of computational work required to unlock a lock may be assigned.

FIG. 8 shows a sequence of steps that may be performed by the network of FIG. 2C to process a user request.

FIG. 9 shows a sequence of steps that may be performed by a conventional database query processing system to derive a plan for processing a query.

FIG. 10 depicts one example of a table that shows the amount of computational work needed to perform a data retrieval operation that generates an output of various sizes.

FIG. 11 depicts one example of a table that shows the amount of computational work that is needed to perform a transaction based on the percentage changes the transaction will cause to numeric values stored in the data records.

FIG. 12 depicts one example of a table that shows the amount of computational work that is needed to perform a transaction based on a measure of the range by which a requested transaction differs from previous such requests.

FIG. 13 shows one example of method for processing a user request that asks "who is customer John's banker."

SUMMARY

Figure 1A:
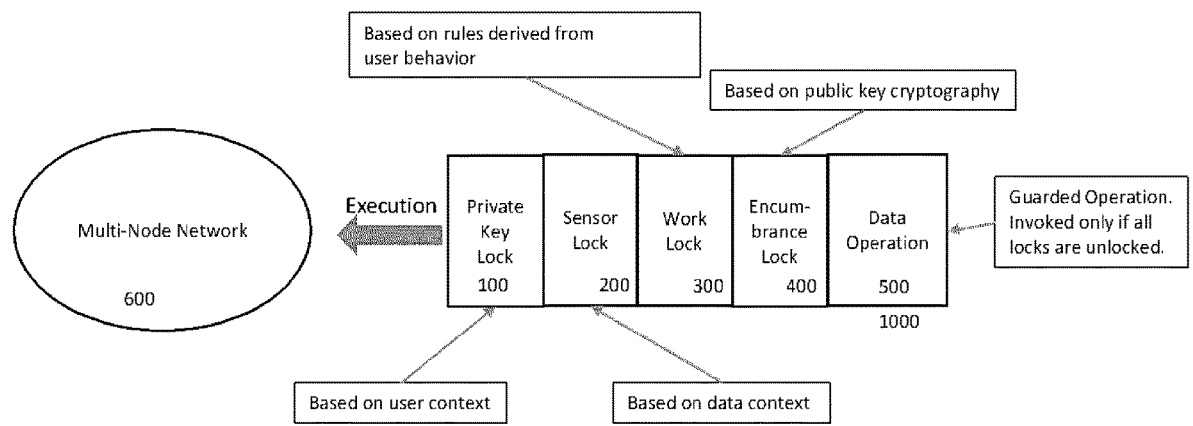
FIG. 1A shows a computing entity that controls the invocation of an operation R by creating a series of locks.

In accordance with one aspect of the subject matter disclosed herein, a method and system is provided for accessing stored data. In accordance with the method, a request is received to access data stored in a data storage unit. The request requires one or more data operations to be performed by a system having access to the stored data. Responsive to the data request, one or more locks are derived and assigned to one or more of the data operations. Each of the locks control invocation of the data operations to which the respective lock is assigned. The deriving is based in part on (i) user context data obtained from a user issuing the request and (ii) data context comprising one or more attributes of the request. Each of the one or more locks is unlocked and the one or more data operations are invoked after the one or more locks are unlocked.

In accordance with another aspect of the subject matter disclosed herein, a method of authenticating a user is provided. In accordance with the method, a temporal sequence of operational data is collected from network-related activities of the user to be authenticated. The operational data is indicative of user interactions with one or more networks and one or more smart devices. The temporal sequence of operational data is compared to a temporal sequence of previously obtained template data of the network-related activities of the user. The user is determined to be an authenticated user if the temporal sequence of previously obtained template data matches the temporal sequence of operational data to within a specified confidence level.

DETAILED DESCRIPTION

In one aspect, the present invention addresses the stored data vulnerability problem. We propose a system and methods that reduces data vulnerability by making it computationally infeasible for malicious changes and accesses to succeed from authorized or unauthorized users. In simpler words, the present invention does not seek to eliminate attacks altogether from the outset or inception. Rather, it makes it highly unlikely that an attack will succeed. Moreover, the probability that an attack will succeed may be made infinitesimally small by judicious choice of certain parameters, said choice being in the purview of system administrators. The price of such choices is decreased system response time or use of more computing power.

By the term "computationally infeasible" we mean that to gain access to data requires an entity, authorized or unauthorized, to perform certain computational tasks and pass certain tests. The tests and the tasks cannot be faked or guessed correctly unless the laws of thermodynamics concerning entropy are wrong in the sense that the probability of correctly guessing the answers is astronomically small. Therefore, the entity is compelled to actually perform the tasks and pass the tests.

The present invention does not attempt to understand the software programs managing the stored data or the incoming queries and transactions. It, therefore, avoids the usual and well-known problems associated with program understanding. Rather, it relies on a thermodynamic or computational notion of work. To gain access to data requires the associated computational work to be finished. The notion of work is not fixed or set by default. Rather, it is parameterized by user behavior, user identity, past access history of user, magnitude of change in data requested by the user, amount of data accessed by user, etc. Each data access operation is analyzed along with the user making the request and his context to determine the parametric amount of work that needs to be performed to gain access. Each set of conditions or restrictions may be viewed as a hurdle that needs to be cleared to gain access or make changes to stored data.

Furthermore, more than one computing entity may compete in carrying out the thermodynamic (i.e., computational) work associated with a requested data access and the entity that finishes before any other entity, i.e., the first to finish, acquires the right to access the data. Thus, the hardware used by an entity to accomplish the work needs to be capable of certain minimum speeds or some other hardware entity will finish first. In this sense the present invention uses a technique similar to that used in cryptocurrency networks such as the Bitcoin network. The invention partly relies on the required hardware speed to be such that the minimum capability of the underlying hardware requires modern manufacturing technologies, e.g., 14 Nm chip fabrication technology, that only became known to the world circa 2014, or later, such as 10 Nm chip fabrication technology that is expected to become available circa 2017. Thus, the idea that some malicious user sitting in a garage using an old personal computer could "impersonate" a hardware entity of the system by solving the computational tasks is highly improbable.

General Explanation

The approach taken by the present invention to solve the problem of safeguarding stored data is based in part on controlling the invocation of software operations that may be explained by recourse to the notion of software locks. A software lock is a software function that takes a certain number of inputs with specific values and returns the answer "true/false". As long as the input values to a lock remain unspecified or are incorrect, it is considered as being locked. If the required input values are provided and the lock evaluates to "true", it is said to be unlocked. If the input values are specified and the lock evaluates to "false", i.e., the input values are incorrect as per the specification of the lock, the function is deemed to remain locked.

Consider the situation described as follows.

Lock L comprises a function F with required input values X, Y, etc. We may depict such a situation as follows.

Lock L: [Function F(X,Y, . . . )|Operation R]

The lock L "guards" the operation R until input values X, Y, . . . are provided to its function such that the function "F" evaluates to "true". The word "guard" indicates that the lock controls the invocation of the operation "R". (In more modern usage, the word "launch" is used as a synonym for invocation, e.g., launching an application.)

A computing entity, wishing to control the invocation of an operation, R, creates a series of locks 100-400 (FIG. 1A). Each lock is based on a variety of parameters as follows.

Private Key Lock 100: Based on the user's private/public key.

Sensor Lock 200: Obtained from rules of user behavior derived, in turn, from sensor data associated with the user's smart devices, smart or sensorized environments and networks.

Work Lock 300: Obtained from user context comprising past access history of current user and other users of the system, nature of request, amount of data being requested, nature of data request.

Encumbrance Lock 400: Obtained from data context comprising the magnitude of change to data resulting from the operation 500 as compared to previous data requests and enterprise regulations and policies.

It is important to note (and will become more apparent momentarily) that the locks are derived by the system in response to received data requests, the derivation being mindful of a certain order in which the locks are to be opened, i.e., order of execution. It is also important to note that the number and strength of locks, i.e., amount of computational effort needed to open a lock, varies with the various parameters of the incoming request, the user and the state of the stored data. Different requests get associated with different locks, different order of execution of locks and different strength of locks. Even a second request received after a first request from the same user may be associated with a different number of locks, strengths of locks, etc., because the stored data may have changed in the interim period.

In some embodiments the sensor lock is based on data derived from a user's smart devices, his network connections, his behavior while accessing one or other networks or transitioning from one device/network to another device/network, his proximity to other smart devices, e.g., smart collar of his dog, etc. Such data may then be used in the derivation of the sensor lock(s) so that the user may get properly authenticated. The work lock may be based on the nature of the incoming request and the current state of the data. The encumbrance lock may be based on enterprise rules and regulations that may impose more or less stringent requirements on the authorizations associated with the one or more users.

We now provide more details on the notion of locking and unlocking. Assume a request for data is received by the system that requires invocation of operation "R". In order to protect invocation of "R", the system now derives a lock, L, that has a function "F" that guards the operation "R". Assume "F" requires two input values and returns "true" if their total equals the integer 7. Note that the constraint that the sum of the two input values must equal 7 is presented for illustrative purposes only. More generally, the input values may be subject to any constraint(s), or even no constraints at all.

Thus, the lock "L" may be written as follows where the notation ?A and ?B is meant to denote variables whose values need to be provided as input to the specified function.

L: [?A:?B:F(A,B){if A+B=7 then "true" else "false"}|operation R]

Figure 1B:
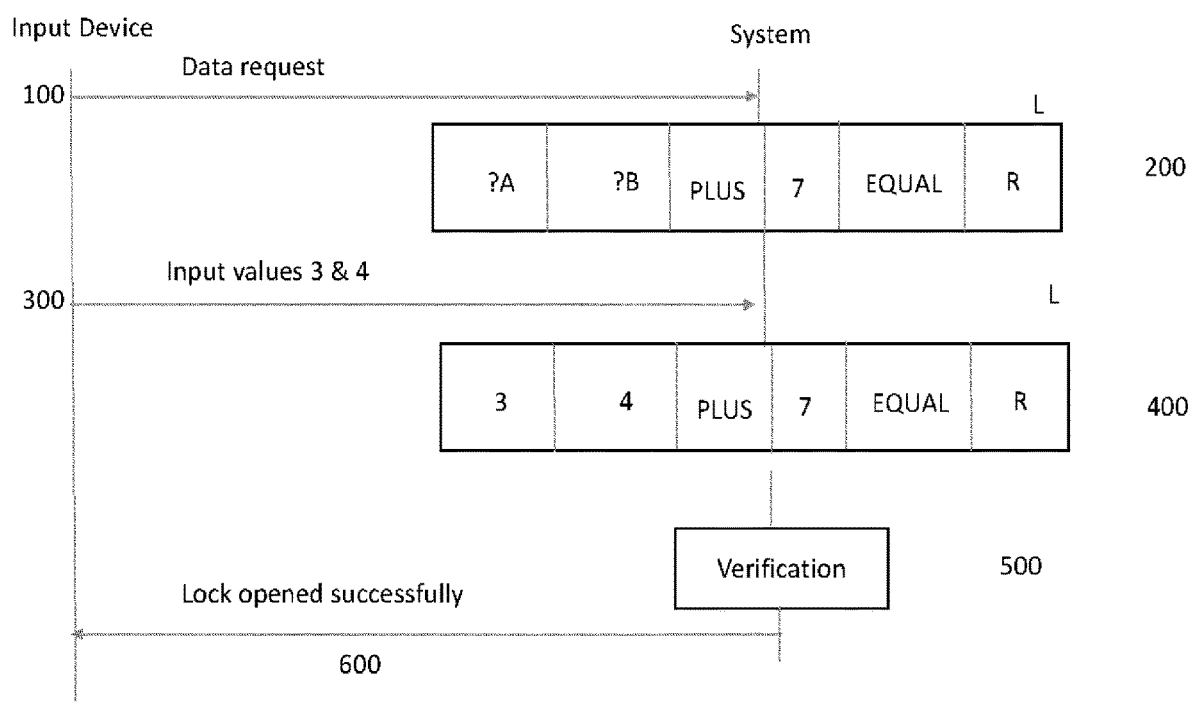
FIG. 1B depicts an example of a method for opening a lock.

FIG. 1B depicts the method followed to open the lock. In step 100 a data request is received from an entity "Input Device" by the entity named "System" that then decides to associate Lock "L" with said received request. We visually present the lock "L" as 200 that may be understood as follows. "The symbols "?A" and "?B" are input variables that need to be supplied with values, and "PLUS", "EQUAL" and "7" are system-provided functions and values, respectively".

In step 300, Input Device provides the values 3 and 4, respectively, that are then substituted for "?A" and "?B" (respectively) into the object 400. In step 500 a verification step is executed (detailed later) resulting in the lock "L" being opened successfully (600). Thus, the operation "R" may now be invoked since the lock has been opened.

Figure 1C:
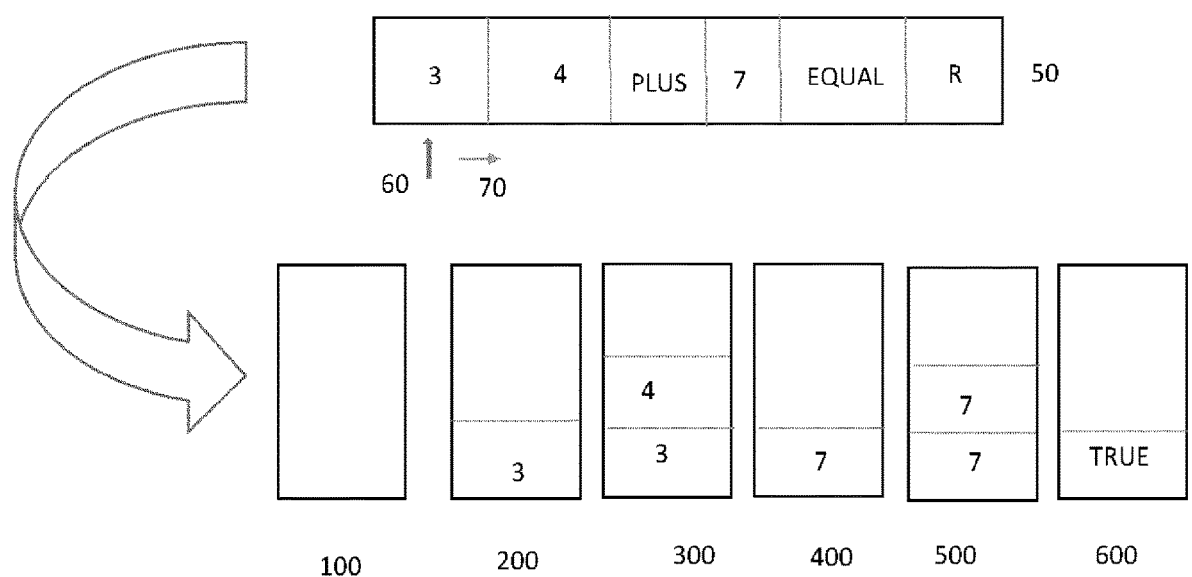
FIG. 1C shows one example of the verification step employed in the method of FIG. 1B.

FIG. 1C shows the details of an example of the verification step indicated above. To verify object 50, this example uses a stack-based machine well known in prior art. FIG. 1C shows the various states of the stack 100 through 600. The stack-based machine works as follows.

The object to be executed, i.e., input to the machine, is shown as 50 with the pointer 60 moving from left to right one square at a time as indicated by arrow 70. If the arrow 60

Points to a value, the machine moves the value on to the top of the stack and moves itself right one step.

Points to a function, the machine applies the function to the value(s) at the top of the stack (consuming the values in the process), i.e., "pops" the stack, and puts the result on top of the stack.

Reaches the end of the input and the value at the top of the stack is "TRUE", the machine is assumed to have a true verification. Else the verification fails.

Assuming the input is as shown as 50 in FIG. 1C, the machine proceeds as follows.

Initially the stack is empty (100) with the pointer 60 pointing to value "3". The machine puts the value "3" on to the stack (200) and moves one step right, i.e., it now points to the value "4". Next, the machine stacks the value "4" and moves right (300).

The machine now sees the function "PLUS" and applies it to the top two values on the stack, consuming the two values in the process. The result is "7" that is placed by the machine on the top of the stack (400). The machine moves its pointer right.

Next, the machine sees value 7 which it stacks (500) and moves its pointer right. Now the machine sees the function "EQUAL" and applies it to the top two values of the stack, consuming the two top values on the stack, and placing "TRUE" being on to the top of the stack.

Since the machine reaches the end of its input and the top value of the stack is "TRUE" the machine has successfully verified the object.

It is important to note that the stack-based machine imposes an order of execution in which the locks are to be opened. Thus, if the stack machine is applied to the locked object shown in FIG. 1A, the order of execution of the locks will be "left to right". In general, those of ordinary skill will note that stack-based machines impose an order described as "reverse polish" or "post-fix" order, e.g., 35+7* is postfix notation for the more commonly known ((3+5)*7) infix notation. Those of ordinary skill will also note that the choice of a stack-based machine is not limiting. Many other forms of abstract machines are available and could have been used and that different machines may impose a different order of execution on the locks. In the present exposition, stack-based machines are used for pedagogical reasons only and not as a limitation on the present invention and, as observed, they impose a left-to-right execution order on locks.

We may now describe our general approach to solving the problem of safeguarding stored data as follows. If an incoming request requires the use of one or more data operations, we derive one or more locked objects so that we may control the invocation of certain data operations in particular ways.

Furthermore, we execute the above created locked objects on a multi-node network 600 (FIG. 1A). We explain the method of execution of locked objects on the multi-node network 600 in more detail later. Generally, the multi-node network comprises a distributed set of computers, each of which receives a copy of a locked object. Each computer executes the locked object that it receives by first attempting to open the locks of the locked object in the required order. The first computer to successfully open all locks gains access to the guarded operation, i.e., gets to invoke the guarded operation.

Since the locks require computational effort, computers with differing resources, e.g., CPU power, will, in general, take differing amounts of time to open the locks. Hence, one or more computers in the multi-node network will finish first. As will be seen, such a multi-node network creates a more secure computing environment.

Key Authentication

Before describing the main components of the system and methods of the present invention, we describe certain prior art that will be useful in the presentation to follow.

Prior art makes a distinction between authentication and authorization. Authentication is the process by which an individual's identity is confirmed. Authorization is the association of rights and permissions with that identity.

The use of certain kinds of cryptographic functions to generate "keys" to authorize access to computer systems and data is known in prior art. However, in public cryptography based systems, the identity of users, i.e., the authentication problem remains unsolved.

This aspect of the problem is known as the public key authentication problem. Generally, whereas a public key is widely known, there is no satisfactory known solution to ascertain the identity of the person corresponding to the public key. That is, the association between a public key and a person's identity is unverified and is thus subject to malicious use.

Networking Environment

A node is a collection of one or more computers that are configured to collectively perform a desired group of functions. Networks usually define a message propagation mechanism, also called a protocol, by which messages/information is communicated between nodes of the network. A peer-to-peer network is a network of one or more nodes inter-connected so that one node connects to one or more other nodes, called its peers, who in turn connect to their peers, etc. Thus, for example, to propagate a message throughout the network, a node may send the message to its peers, who may then send it to their peers, etc. Peer-to-peer networks may use broadcast style protocols or other forms of protocols to propagate messages between nodes. In the present invention, we assume using broadcast style protocols for pedagogical reasons and without limiting the inventions herein. For example, we may consider a particularly simple form of a propagation protocol by assuming that the network is fully connected. One implication of a fully connected network of "N" nodes is that any node has "N–1" peers. Alternatively, fully connected networks are such that all paths have unitary length, i.e., the networks are one-hop networks. We require that the propagation protocol be such that it maintains mutual consistency and full replication of messages across all nodes of the network.

A network as described may be logically partitioned into one or more sub-networks, each sub-network comprising one or more nodes. Such a partitioning may be done for reasons of geographical distribution or for reasons of localizing certain functions to certain nodes of the network, etc. In the latter case, all nodes in the sub-network may be required to perform the same set of functions, i.e., the sub-network may said to be homogenous.

Computational Work and its Proof

Prior art describes a class of functions based on computational irreversibility, i.e., functions that produce an output for a given input with relatively less computational effort; however, the input for a given output cannot be calculated easily, e.g., without resorting to random guesses over an astronomically large space of possibilities. Examples of such functions are SHA128, SHA256, the so-called Rabin function, the discrete logarithm function, etc. For example, the function SHA256 takes as input any string of information (text, numbers, characters, etc.) and produces—without much computational effort—, as output, a string of 256 bits (or 64-hexadecimal characters in the range [0,1,2, ..., 9, A, B, C, D, E, F].

However, finding an input that will cause SHA256 to generate a given output requires, in general, enormous amount of computation; no efficient methods are known to find such inputs.

Consider an input to SHA256 producing a string of binary digits as the output. The probability that the first bit in the output is "0" is 50% and decreases geometrically for succeeding bit positions. Consider, now, the following problem. We are given an input, say "hello". We are supposed to "append" a string, called the "nonce", to "hello" such that "hello+nonce" when supplied as input to SHA256 produces a number that is less than a given number, called the "target". For example, the target could be a number that has 5-leading zeroes. We could then run SHA256 repeatedly, each time "guessing" a "nonce" until the output is less than the target. Thus we may start feeding inputs "hello1", "hello2", etc., to SHA256 until it produces as output a string that is less than the target.

Whereas using SHA256 to do a certain amount of work may require a lot of guessing, i.e., large amounts of computational work, verifying that the required work has been done is relatively easy. Given the input "X", nonce "Y", and the target "Z", we merely need to append Y to X, feed it as input to SHA256 and compare the output to the given target "Z".

Concretely, a locked object based on proof of work may be set up and represented as

[?nonce:?input:?target:verifyWork|operation R]

where "verifyWork" is assumed to be a system-provided function using SHA-256 that returns "true" when executed on the stack machine described earlier, if the values provided for "nonce", "input" and "target" satisfy the conditions for SHA-256 described above. The above process of verifying computational work is called proof of work. Note, that proof of work requires that we be told the input, nonce and the target number.

Logs

A request to a node is a command to said node to perform one or more actions based on said node's logic. A log is a reserved amount of memory associated with a node of a network. Each node has its own log.

A log records the requests received by a node. In particular, it partitions requests into two categories (1) requests that have been satisfied, and (2) requests that remain to be satisfied. As stated earlier, the propagation protocol of the network is assumed to maintain mutual consistency and full replication of the logs across all nodes of the network.

A node, upon receiving a new request, assigns it a user identification number and a time stamp indicating the "network time" it was received. Said node may then propagate the newly received request to its peers in the network. A node upon receiving a request may record it in its log as an unsatisfied request. Since a new request may arrive at more than one node in a peer-to-peer network, a node may receive duplicate unsatisfied requests.

In particular, at any given moment, the log of a node may contain a list of satisfied requests (organized by, say, received time stamps) and a list of unsatisfied requests. The latter list, in one embodiment, may be organized as a First-In-First-Out (FIFO) list.

The main task of a node is to satisfy the unsatisfied requests on its FIFO list. Thus, a node selects an item from the front of the FIFO list, satisfies it and, if successful (as explained later), announces its success to its peer nodes of the network. The announcement includes details of the successfully satisfied request. Nodes receiving such an announcement record it accordingly, i.e., the receiving node modifies its satisfied and unsatisfied lists to be consistent with the newly received announcement.

Consider a network at the time of initialization, i.e., logs of all nodes have empty FIFO lists (the satisfied lists may be assumed to be empty or not). Now a new request is received by a node who records it in its log, assigns it a user identification number and a received time stamp, and propagates it to all its peers.

All nodes receive the propagated request and record it in their FIFO lists. In accordance with their main task, as described above, the nodes select the first item on their FIFO list, in this case the newly arrived request, and attempt to satisfy it. If a node is successful in satisfying the request, it announces it to all other nodes in the network.

Assume a node "N" that is attempting to satisfy a request receives an announcement that some other node has succeeded in satisfying the request. The node "N" is then required to accept the announcement, i.e., node "N" verifies the received information as being valid (as explained later) and if the verification is successful, node "N" moves the request from its FIFO list to the list of satisfied requests. It then may proceed to attempt to satisfy the (next) first item on its FIFO list.

We may now add more information to the general description of the present invention. A data request, i.e., a request received from a user to access a certain data item, is received by one or more nodes of the network. The received request is used to derive one or more locked objects, each locked object having one or more locks with varying strengths, guarding certain data operations. The locked objects are added to the FIFO lists of the nodes of the network. At some later time, all nodes of the network engage in attempts to satisfy (unlock) a locked object. The first node to unlock the locked object gets to invoke the guarded data operation.

It is thus seen that the success of a node in satisfying an incoming data request depends on the node's ability to unlock all the locks guarding the one or more data operations entailed by the incoming request.

An illustrative Embodiment

Figure 2A:
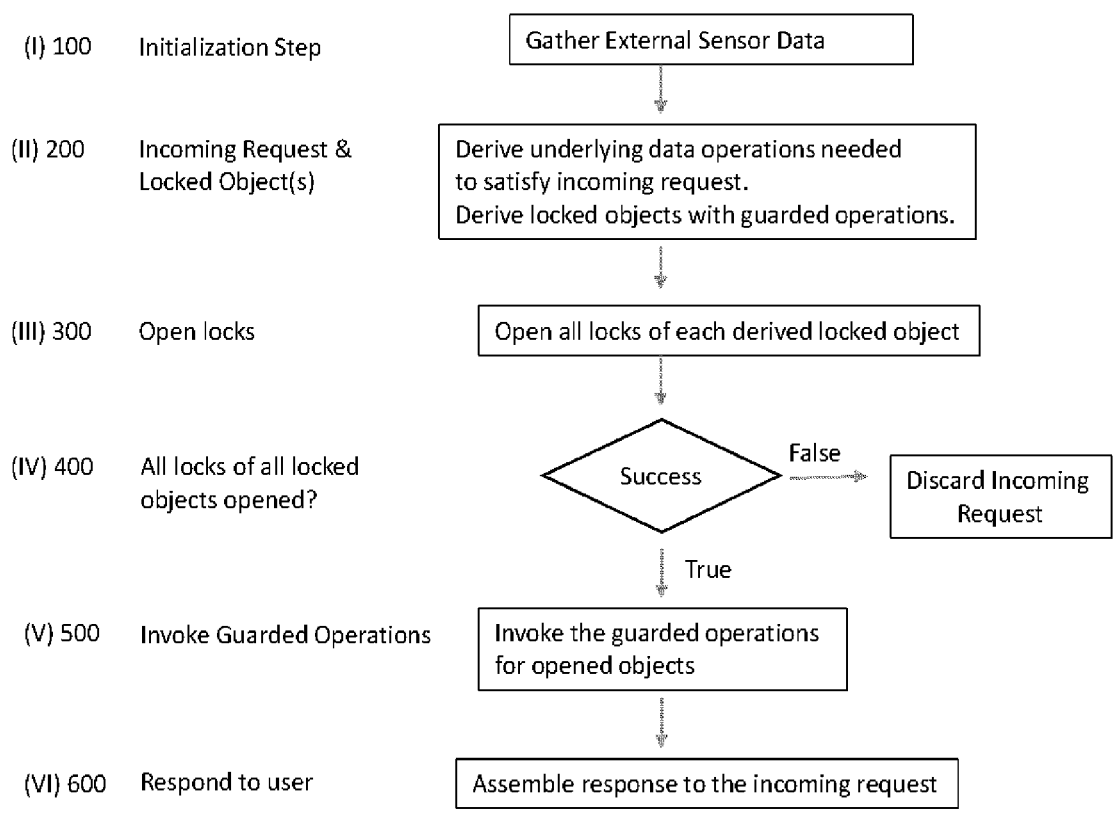
FIG. 2A is a flowchart depicting one example of a method for accessing locked objects such as stored data.

The overall and general method by which requests are processed by an illustrative embodiment of the present invention is shown in FIG. 2A.

In step 100 (Initialization Step) various kinds of sensor data is gathered to prepare the system to authenticate identities of users. This data is used to derive the sensor locks.

In step 200, an incoming request is analyzed to determine the entailed data operations. Locks are derived to guard the entailed data operations.

In step 300, attempts are made to open all locks of all derived locked objects in turn. In step 400 a determination is made if all locks have been successfully opened for all locked objects. In step 500 a successful unlocking of all locked objects results in the invocation of the one or more guarded data operations. If any locked object fails to be opened for the incoming data request, all the derived objects and the data request is discarded.

In step 600, the results of invoking the various data operations are assembled as a response to the incoming request.

Figure 2B:
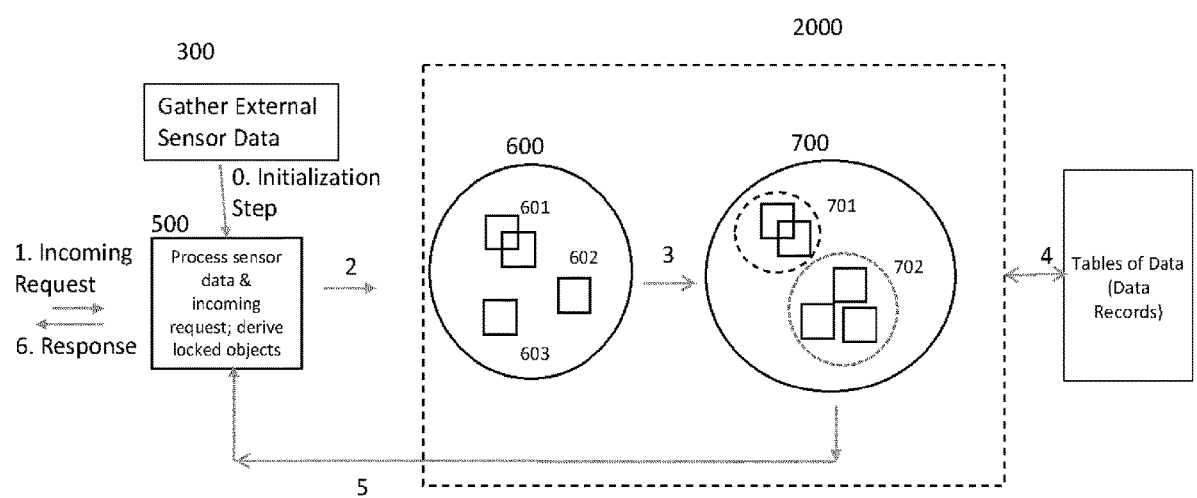
FIG. 2B depicts a logical schematic diagram of one example of a peer-to-peer network that may be used to implement the method of FIG. 2A.

FIG. 2B depicts a logical schematic diagram of a peer-to-peer network that may be used to implement the process of FIG. 2A.

A computer (or a device containing a processor) that has a network connection is referred to herein as a smart device. It may additionally also contain sensors (hardware or software) or be in the range of other sensor devices (proximate to sensor devices) that produce data relating to the state, environment or condition of the smart device or the user of the smart device. In FIG. 2B, 300 depicts one or more computers tasked with gathering sensor data originating from various kinds of smart devices that may contain or be proximate to sensor devices. The data so gathered is provided to one or more computers 500.

One function performed by computers 500 is to transform sensor data gathered by devices 300 into formats that are required by other components of the system. Another function is to accept incoming requests from users and determine a list of primitive data operations entailed by the incoming request. Yet another function of computers 500 is to derive one or more locked objects corresponding to the determined primitive data operations and to inject the former into the network 2000.

Network 2000 is composed of two (2) sub-networks numbered 600 and 700, respectively. 601, 602 and 603 are nodes of the sub-network 600. 701 and 702 are nodes of the sub-network 700. No assumption is made that any of the nodes 601, 602, 603, 701 and 702 contain similar computers or arrangements and number of computers. Only a few nodes are shown as comprising each of the sub-networks 600 and 700. In practice, the sub-networks may contain more or less than the number of nodes shown. All nodes in sub-network 600 perform the same logical function. However, they may differ in their structure and number of physical computers, amount of memory, etc. Similarly, all nodes in sub-network 700 perform the same logical function. However, the logical functions performed by nodes of sub-network 600 are different from the logical functions performed by the nodes of sub-network 700. That is, the two sub-networks 600 and 700 perform different functions and they are individually homogenous sub-networks.

The arrows in FIG. 2B represent the flow of control and data. Arrow marked 0 is meant to convey an initialization step during which sensor data is gathered and readied for later use. Arrow 1 indicates the arrival of a new data request. One or more locked objects corresponding to the received data request are derived and injected (arrow 2) into the sub-network 600 from whence control flows to sub-network 700 via arrow 3. Next, data operations that have been unlocked by sub-network 700 may be invoked (arrow 4) against the stored data records. In step 5 data from the invocation of the guarded operations is sent to the computers comprising 500 from whence it is assembled into a response to the incoming request.

Figure 2C:
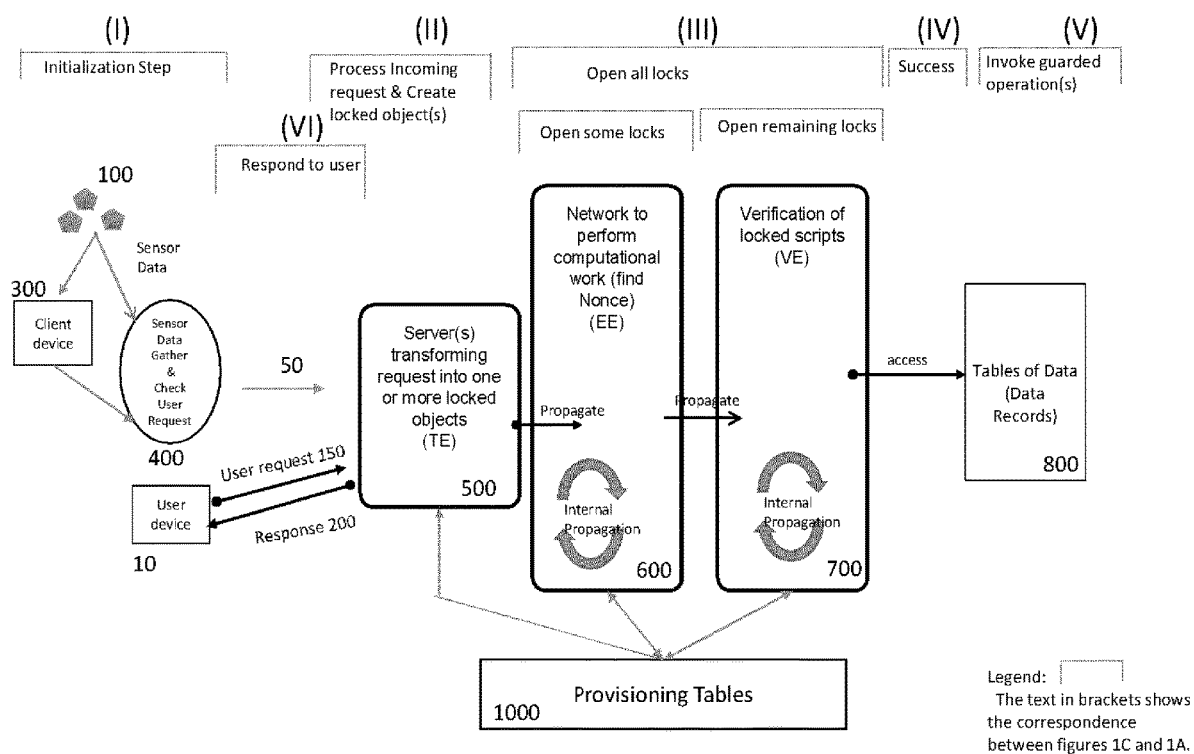
FIG. 2C shows a functional diagram of the network shown in FIG. 2B which is used to implement the method of FIG. 2A.

FIG. 2C shows a functional breakdown of FIG. 2B (and the method of FIG. 2A). 400 comprises one or more computers tasked with receiving sensor data from one or more smart devices 300 containing sensor devices or being in close proximity 100 to a smart device of a user. Module 400 may aggregate the incoming sensor data, normalize it and prepare it for processing by other components of the system.

A smart device may in some cases incorporate or otherwise be associated with one or more hardware or software sensors that gather and transmit data relating to the state, environment or condition, position, etc., of the smart device. A smart device may also receive such data from other types of sensors which are themselves smart devices (that is, they include a processor and a network connection). Examples of smart sensor devices include beacons such as Apple's iBeacon, smart watches, smart thermostats, refrigerators, devices containing GPS location technologies, indoor GPS systems, medical sensor devices worn by users such as pedometers, blood pressure monitoring devices, pulse oximeters, devices that may perform tests currently performed by invasive techniques, fitness bracelets, etc. Mobile devices such as smart phones, tablets, smart glasses, smart watches, wearable computers, etc., containing one or more sensors are also considered as exemplary smart devices within the purview of the present invention.

In an initialization step, various sensor data is received, gathered, and tabulated by 400 and is provided to other components via connection 50 as indicated and as needed by said components.

A user request 150 is received by one or more computers (500) and possibly responded to by 500 via response 200. FIG. 2C Transformation Engine (TE) 500 represents one or more computers whose main function is to derive locked objects to guard the data operations entailed by the incoming requests.

In FIG. 2C Execution Engine (EE) 600 is a sub-network of one or more nodes whose main function (as described later in more detail) is to unlock all locks of the locked objects injected from 500, except for the encumbrance locks.

In FIG. 2C Verification Engine (VE) 700 is a sub-network of one or more nodes whose main function (as described later in more detail) is to unlock the encumbrance locks of the locked objects.

FIG. 2C 800 depicts a set of stored data records that may be accessed by invoking certain data operations. Once, all locks of a locked object have been unlocked, the guarded operations in that lock may be invoked against the stored data records.

FIG. 2C shows 600 and 700 as distinct sub-networks each having its own set of nodes performing certain functions. As stated earlier, the functions performed by nodes of the sub-network 600 and those of sub-network 700 are different. Each of the sub-networks 600 and 700 is individually homogenous but their combination is non-homogenous.

The arrows marked "propagate" are meant to show that messages are propagated into sub-network 600 and from 600 to sub-network 700. The circular arrow marked "Internal Propagation" is meant to convey that messages are propagated within the indicated sub-network. The arrow marked "access" indicates that nodes in sub-network 700 have the necessary authorizations to access the resources in 800.

FIG. 2C 800 represents data records, e.g., as described in relational database technology. FIG. 2C 1000 is a collection of data tables accessible to 500, 600 and 700 and contains various provisioning data and secondary indexes that will be discussed in greater detail later.

Relational Model of Data

In 1970, E. F. Codd invented the Relational Model of Data that forms the basis of so-called relational database systems. (The term "Large Shared Data Banks" is historical and was used by E. F. Codd in his seminal paper "E. F. Codd: A relational model of data for large shared data banks, Comm. of the ACM, Vol. 13, Issue 6, June 1970".) In the present invention we use the relational model of data as an exemplary data storage system. However, the methods of the present invention are generally applicable to all data management systems.

Figure 3A:
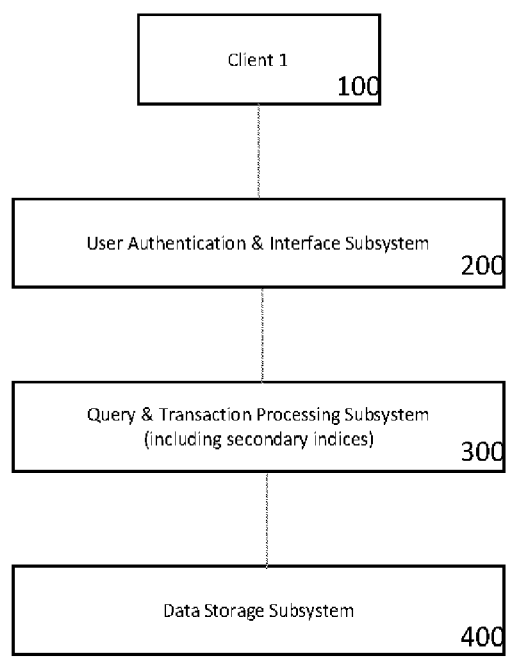
FIG. 3A shows an exemplary block diagram of the primary subsystems of a relational database system.

FIG. 3A shows an exemplary block diagram of the primary subsystems of a relational database system. Client1 (100) is a computer program configured to access the relational database system. It may run on a variety of computers such as desktops, mobile computers, tablets, laptops, smart devices, etc. Said computer program may run on any number and kind of processors that are contained within other devices. Said computer program may receive input in the form of text, audio, video or machine-readable strings or combinations thereof. It may produce output in any one or combination of the formats specified above. Subsystem 200 authenticates the user, i.e., the client devices, and accepts incoming queries and transactions that are then passed on to subsystem 300 wherein they are processed. The subsystem 400 generally consists of one or more data access methods by which stored data may be retrieved, edited, changed, etc. Subsystem 400 also generally controls and manages peripheral storage systems such as disk drives, magnetic tapes, etc.

FIG. 3A depicts a logical view of the subsystems. In practice, one or more of the subsystems, e.g., Data Storage Subsystem 400, may be distributed across multiple devices that may themselves be situated at geographically disparate locations. Thusly, there arises a need for communication links to inter-connect the various distributed components.

One method to organize the Data Storage Subsystem is as a collection of horizontally partitioned datasets (also called Shards) that are inter-connected via communication networks, each such partition residing in a different cloud cluster. For example, data records of customers whose zip codes are less than 50000 reside in one partition, say East, and data records for customers with zip codes greater than 50000 reside in a second partition, say West. In order to derive the total set of customers, we may then need to perform a union over both shards.

Figure 3B:
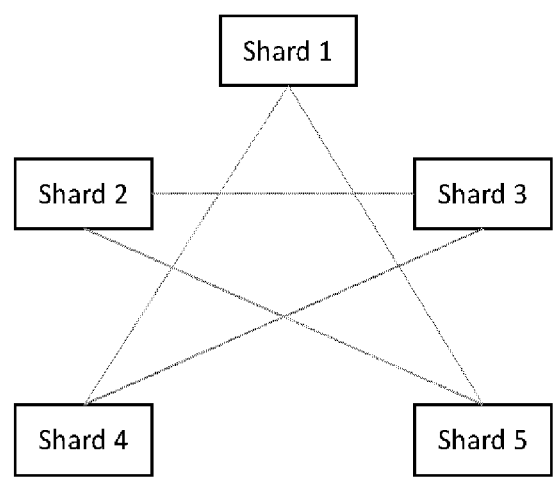
FIG. 3B shows an exemplary arrangement of data as shards.

FIG. 3B shows an exemplary arrangement of data as shards. Tables are split into shards and stored at geographically distributed sites, accessible through various communication networks utilizing any number of network topologies, e.g., FIG. 3B shows a star network topology of 5 distributed sites that are used to hold shards of tables. In such an arrangement, since all nodes are not connected to all the other nodes, a data request may entail intermediate transport to one of the auxiliary nodes for aggregation purposes. Such retrieval techniques are part of prior art.

Access to the individual shards may then be based on cryptographically authenticated requests.

A benefit of arranging data as shards is that considerably fewer amounts of data may need to be transported and processed in order to answer user queries. For example, queries involving east coast customers in the above example may need access to data contained in only a local shard.

Figure 3C:
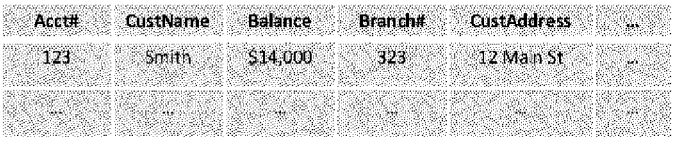
FIG. 3C illustrates an example of a relational database.

FIG. 3C illustrates an example of a relational database comprising three relations CUSTOMER, BRANCH and BANKER. The first two relations may be implemented as tabular data structures with one possible example shown in FIG. 3. The BANKER relation may be implemented also as a tabular structure or as a derived relation by using relational algebra operators known from prior art. (The pros and cons of such a decision are well discussed in prior art.) Note that the relationship "Banker" between a Branch Manager and a Customer may not be explicitly stored in the database; rather, it may be derived by manipulating other pieces of data. In the present exposition we assume the latter option. FIG. 3C also shows sample queries and transactions.

Note also that the database schema does not contain any data values, only descriptions of the structure of the database, how many relations, what attributes, what attributes serve as identifiers, etc.

It is also to be noted that certain attribute/values serve to uniquely identify one or more tuples of the relations. Such attributes are dubbed key attributes and are not to be confused with "private" and "public" keys as discussed later.

As is well known in prior art, key attributes are used to construct secondary index data structures that allow efficient retrieval of data. With reference to FIG. 3A the query and transaction processing subsystem depicted as (300) in FIG. 3A contains secondary index data structures.

In query processing systems, typically, the following general method is executed. Client system 100 (FIG. 3A) generates a query that is received by subsystem 200. The identity of a querying user is authenticated via user-provided credentials and the query is forwarded to the query subsystem 300 if a determination is made that the user is allowed to access the system/data. Software logic in subsystem 300 calculates what tuples (data records) are needed, said tuples being identified by their key attribute/value pairs. Such a sequence of actions that, when executed leads to answering a given query, is called a "plan" in prior art. Plans use the information contained in the schema description of the database. The key attribute/values are used to retrieve tuples from the data storage system 400 that may then be returned as answer sets to the query.

We observe that a fundamental component of plans involves access to stored data. Once data has been accessed, it may be manipulated and processed before it is sent as a response to the incoming request. All data management systems at a basic and fundamental level require stored data to be accessed at some point as a part of their query and transaction processing systems.

Therefore, the embodiments described herein concentrate on the applicability of the present invention to data access operations and, thus, the present invention is not limited to applications in relational database systems only. In particular, the present invention applies to all data management systems that rely on data operations accessing stored data.

In conventional database systems, a distinction is made between a query and a transaction. A query is a request that does not change the state of the data. For example, "what is John's account balance" is a query. A transaction is a request that changes/adds/modifies/deletes the state of data. For example, "add $200 to John's account" is a transaction.

It is to be noted that, in a relational database, the size of the answer to a query, in practice an upper bound, may be computed by recourse to the schema information and the secondary index structures before the actual retrieval of the data, e.g., the size of the secondary index gives an upper bound on the number of tuples/rows in a relation/table. The size of a relation/table is the number of tuples/rows in the relation/table.

A transaction, generally speaking, is processed in logical terms as follows.

The first step is to treat the received transaction as a query in the sense that the needed data tuples are retrieved and modified as per the requirements of the transaction and stored back in the database. If a new data value is to be inserted in the database that does not pre-exist in the database, e.g., a new bank customer account, one may assume the corresponding transaction as comprising a null query followed by an insertion of a tuple in the database. A null query is a query whose answer is empty.

Public Key Cryptography

We now describe the functioning of the preferred embodiment of FIG. 2C by first starting with the problem of authorizing users. Recall, authorizing users involves determining the rights of users based on their identity that is established by authentication procedures.

Prior art recommends using public key cryptography to authorize user requests. In such systems, a user generates a pair of cryptographic data called the private and public keys. Public keys are known to all; private keys are known only to their owners. A pair of public and private keys form a unique pair.

Suppose that user Bob wishes that only Alice may be able to invoke an operation "R". Bob may then create a locked object. Let the public key of Alice be Pub(Alice) and her private key be Pri(Alice). Then FIG. 4A shows the corresponding locked object. Note, that the locked object can only be opened by Alice since only she has access to her private key. To unlock the object, Alice has to provide her private key as input to "?Pri(Alice)"; her public key is known to all and may be incorporated into the function "Private Key Lock".

Thus, a lock designed to be opened only by Alice may be represented more succinctly by the lock [?Pri(Alice):Private Key Lock] assuming that the corresponding public key has been incorporated into the function "Private Key Lock" (FIG. 4B). A private key lock designed to be opened by Alice and Charlie collaborating between each other may be represented as [?Pri(Alice):?Pri(Charlie):Private Key Lock] (FIG. 4C). The latter will require inputs from both Alice and Charlie for the function "Private Key Lock" to open the lock, assuming their respective public keys have been incorporated into the function "Private Key Lock".

Environmental Sensory Indicia (ESI)

Turning now to the problem of verifying the identity of a user, i.e., authenticating the user, we observe that a central problem with public-key cryptography is that it does not provide proof that a given public key is authentic, i.e., it belongs to the claiming party. The association between a public key and a personal identity may be fraudulent. To quote Wikipedia "To date, no fully satisfactory solution to the 'public key authentication problem' has been found" (Online Wikipedia, en.wikipedia.org/wiki/Public-key cryptography).

The typical manner in which prior art has solved the public key authenticity problem is to involve a "trusted third party" that acts as a certifier of the public key. However, the scheme fails if the trusted party turns malicious.

We now describe a method to establish the identity of a user of the system of the illustrative embodiment. The method is based on sensory data obtained from a user's smart devices, sensors associated with the user's smart devices, other smart devices in close proximity to said user, networks (wired and/or wireless) in communication with the user's smart device and so on.

It is common nowadays for users to own and use multiple smart devices. A smart device is a computer (or a device containing a processor) that has a network connection. It may additionally also contain sensors (hardware or software) or be in the range of other sensor devices (proximate to sensor devices) that produce data relating to the state, environment or condition of the smart device. Examples of smart devices are, but not limited to, desktop and laptop computers, tablet computers, mobile devices (e.g., mobile phones, smart watches, smart glasses), devices that incorporate mobile devices, etc.

Data from physical or software-based sensors within or proximate to smart devices may be received, processed and collected by smart devices or sent to servers in connection with smart devices.

For example, the work location of a user may support a Wi-Fi network. Thus, when the user is at his work location, his smart device may connect with the Wi-Fi network, receive data from the Wi-Fi router, record said data or send it to a server connected to said smart device.

Furthermore, when a user is at home, his smart phone may connect to his home Wi-Fi network that may generate a different data set. When the user is in his car, his smart device may establish a Bluetooth connection with the music system of his car, thus generating other recordable data.

It is thus seen that as the user goes about his daily routine, his smart device(s) receive data from one or more other smart devices, sensors and networks. We may thus acquire data about such devices, the time and duration of connections, patterns of connecting to one network/device followed by connecting to another network or device, etc. Thus, the presence of the user on various networks, his transitions from one network to another, the duration and timing of such network presences, his presence at various geographic locations and the associated dates, times and days may all be recorded as datasets by a user's smart device(s) or by servers connected to said devices. Such datasets may be referred to as environmental datasets and may be analyzed resulting in deriving a pattern from events. For example, we may be able to describe one such pattern as "User spent X amount of time in his office, Y amount of time in his car, and Z amount of time in his house". As another example, we may derive a rule that a user transitions from network X to network Y in more than 80% of all network transitions.

The information in environmental datasets may be used to obtain a summary as shown in FIG. 5. The table shows data for a user "user1" whose environmental data is averaged over one week. The table shows that during the week, user1 on average, spent 6 hours connected to his work Wi-Fi, 8 hours per day connected to his home Wi-Fi and 30 minutes on the average to a Bluetooth network. A second table shows his transition frequency from one network to another. Such summary data gleaned from daily, weekly or monthly datasets obtained from a user's smart devices or smart devices in close proximity to a user, may be used to establish the identity of said user as follows.

A user is first required to provide sample data for a certain length of training period, say 1 week. In order to obtain sample data, the user may be monitored by human operators, e.g., security personnel. The user may also be asked to wear monitoring equipment such as wearable smart bracelets, etc. During this week, the system aggregates data from said user's smart devices, human operators or proximate devices into a dataset. The dataset is then analyzed to produce a summary dataset, represented as a table called the Identity Table.

At the end of the training period of 1 week, said user enters a so-called operational phase, during which data from the user's smart devices or proximate devices are aggregated into a row of the Identity Table called the Operational Row on a "rolling" basis. It is important to note that the actual row is kept up to date in a "rolling week" fashion, i.e., the system always has the latest week's data.

In order to establish the identity of a user, at the time when said user makes an access request, the system matches the user's Template Row with his Operational Row in the Identity Table. Based on system administrator's considerations the matching operation may allow approximate matches or exact matches as the situation demands.

Figure 6:
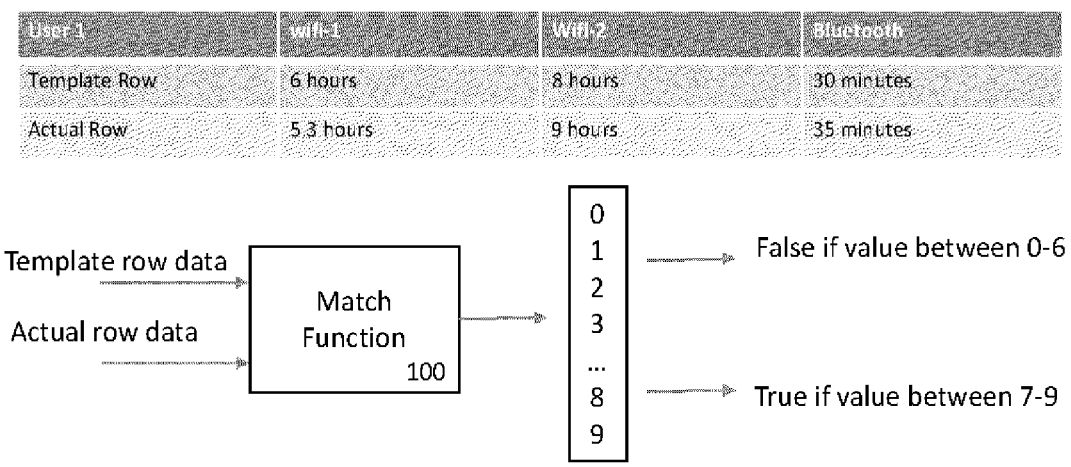
FIG. 6 depicts an exemplary identity table for a user in which a row of template data is compared with a row of operational data to authenticate a user based on the degree of matching.

FIG. 6 depicts an exemplary Identity Table for a user with a Template and an Operational Row based on 1-week of data, i.e., 1 week of template data obtained from the user during the training phase and one week of rolling data during the operational phase. In order to ascertain whether the user's template and operational row values "match", we may use an exact, approximate or fuzzy matching process (all well-known in prior art).

The result of the matching process may be an integer between 0 (No match) and 9 (Full match), which the system may use as a degree of confidence on the matching of the user's template and actual behaviors. The use of such measures in granting access to a user is discussed later. A binary function may be defined for the purposes of matching that matches template and operational row data and returns true/false accordingly.

The idea of deriving a pattern of user behavior from environmental indicia datasets may be utilized to lead to the derivation of powerful patterns. For example, we could aggregate location data and events from a spouse's smart phone and correlate them with data from the mate's smart phone to derive an exemplary pattern such as "the user spent 5 hours per day on average at home with his spouse".

The basic idea behind establishing a user identity through smart device and proximate smart device data is that, in order to fake this data, a malicious user will need to own, hack or break into a genuine user's home, office and car, etc. Such a task can be made extremely difficult for a malicious user by using data from a number of different devices, locations, networks, proximate devices, spousal devices, etc.

Furthermore, we may randomly select data elements from said devices, making it harder for a user to guess the data that is used to assemble the template and actual rows.

Not only will it be hard for someone to impersonate a genuine user, it will be hard for a user who gains access based on his identity information to deny that he accessed the system. Thus, a user who is allowed access via the aforementioned identity mechanism, will find it difficult to deny his culpability.

Whereas the above exemplary description is based on using data from Wi-Fi and Bluetooth networks and devices, more generally data from any devices and networks, including but not limited to location sensors, temporal sensors, wearable computing devices, devices worn by users or their pets in close proximity to a user of the system, etc., may be used.

As another example of using data from a user's actions on his smart devices, consider user actions on social networking web sites such as Facebook, Twitter, etc. One typical user activity is to post messages on web sites, referred to as "tweets" and "instant messages" etc. A particular user's postings may be aggregated over a time period, say several weeks, to discern a pattern. For example, we may observe that the user posts a dozen tweets a day and a score of Facebook updates a week. As explained above, such patterns may be discerned and stored in the Identity Table as the "Template Row" (described above). The user's device then contains the latest dataset, i.e., "Operational Row" (described above).

Continuing with the above example, when a user wishes to access a data storage unit, we may then match the Template and Operational Rows of the Identity Table to ascertain the identity of the user. For example, we may find that the user's latest social networking activity (Operational Row) does not "match" (in the sense described above) with his overall social networking activity pattern (Template Row).

The notion of capturing computational actions and activities of users and extracting patterns from such data is not limited to actions on Wi-Fi networks or social networks, etc. Furthermore, such patterns may be used as being indicative of user behavior and, thusly, may be used for many purposes, identifying or authenticating users being one such purpose.

It is to be noted that the example of the method described above was based on a week's worth of data for the template data collection phase. However, in general any time period may be used, typically at the discretion of the system administrators.

We may utilize environmental datasets to authenticate users as follows. A user issues a request from a software program running on a client device. The software program has previously been used to send data to the system of the present embodiment wherein it is stored as a row in the Identity Table (Template Row). The computer program also records in the local client device the Operational Row of data. (As described, data associated with a "rolling" time period is collected by the computer program.) When the user issues a request, the system generates locked object(s) containing Sensor Locks that may be represented as follows.

[?Operational-Row:Template-Row:sensorLock|Operation R]

The function "sensorLock" uses the match function 100 as shown in FIG. 6. Note that the system possesses the "Template Row" of data (from the initialization phase) and requires the client computer program to provide the "Operational Row" data when the user inputs a request. The authentication requirement is satisfied if the function "sensorLock" returns "true".

User Requests

The general working of the present invention described earlier can now be supplemented as follows with respect to FIG. 2C. It is assumed that in an initialization step, using data from client device 300 and sensor data from devices 100, computers 400 gather and collect environmental datasets to be used as template row data for registered users. Computers 400 make the environmental datasets (containing the Template Row Data) available to subnetworks 500, 600 and 700 by storing the datasets as shown in provisioning tables 1000. The Template Row data may be indexed by user identity or public key.

A user request 150 arrives at TE 500 (FIG. 2C). The user device 10 making the request 150 is assumed to have the necessary Operational Row Data for said user. TE 500 receives the incoming user request and transforms it into a list of primitive data operations (an example of such a derivation is presented later). The list, in general, will have one or more data access operations.

Consider a user request that has resulted in a list of primitive data operations. We now derive one or more locked objects corresponding to the user request. A locked object has the following general form.

General Form of Locked Object
1. Private key Lock
2. Sensor Lock
3. Proof of Work Lock
4. Encumbrance Lock
5. One or more data operations that are guarded by the above locks.

It should be noted that a given locked object may have one or more instances of the various locks or none at all. We now describe the processing of a single locked object for exemplary purposes. Consider a locked object that has one instance of each type of lock above that guard data operation "R".

TE 500 propagates the locked object into sub-network 600 whereupon it is recorded by all the nodes of the sub-network 600 as an unsatisfied request, i.e., in their respective FIFO lists.

In time, said locked object is picked up as being the first unsatisfied entry in the respective FIFO lists by all nodes of the sub-network 600, which then proceed to attempt to unlock the first lock of the object.

Since the first lock is the Private Key Lock, only the user (or his device) may provide the private key that will unlock the Private Key Lock.

Once the first lock has been unlocked by an EE node in EE subnetwork 600, said node announces its success to all the nodes in the EE sub-network 600. All nodes of sub-network 600 verify the received information and then modify their logs accordingly. (Details of verifying received information will be presented later.)

Next, all nodes turn to the second lock that is the Sensor Lock. (Details of opening the proof of work lock will be provided later.) Again, some node of the EE sub-network 600 succeeds in unlocking the second lock, makes a corresponding announcement that is recorded by all the nodes of the EE sub-network 600.

The above process repeats for the proof of work lock. Once the latter lock is opened, the EE sub-network node that opens the proof of work lock, propagates the locked object to the VE sub-network 700 so that any remaining encumbrance locks may be opened. Details regarding the opening of the encumbrance lock(s) will be provided later. Once all the locks have been opened, the guarded operation "R" may be invoked by the node of the VE sub-network 700 that succeeded in opening the last lock.

Returning to the general form of a locked object described above, we note that entries 1 and 2 have been described earlier. We now discuss the remaining entries 3 and 4 in more detail.

Work and Encumbrance Locks

The notion of computational work was introduced earlier. To recall, an irreversible function such as SHA256 is used with a pre-determined input string and a given target number, T. The idea is to find a nonce that, when appended to the input string, produces a number that is less than the given target number.

One aspect of the present invention is to gauge the importance of a user request and derive a work lock whose strength is commensurate with that measure of importance. By the strength of the lock we mean a corresponding amount of computational work.

We can estimate the importance of a request in a variety of ways. For example, we may use the frequency per day of user access derived from the user's previous access history. Other possibilities to consider are the location of a user and/or the device a user may have used to previously issue requests. Requests originating from new/unknown user locations or from seldom-used devices may require extra precaution and could be considered for use also. All these examples stem from analyzing past user access history, stored in the Provisioning Tables 1000 of FIG. 2C.

Consider the table shown in FIG. 7 whose data values are exemplary and show a particular set of data values that may be used (by system administrators and managers) to gauge the importance of a user request. Such tables are meant to capture business rules of enterprises through the use of particular data values. It is also assumed that the columnar values are independent.

In this example, requests from a user who is characterized with a daily user access frequency of less than 2, according to the data values shown in FIG. 7, will result in work locks that require a very large amount of computational work to be opened, i.e., the target has 10 leading hexadecimal zeroes. A user who accesses the system infrequently, i.e., less than twice daily and has a low match score (0-3) will find it computationally hard to gain access. It is to be noted that this outcome is because the data values populating the table of FIG. 7 entail a certain policy. A different set of data values would incorporate different policies.

On the other hand, a frequent user (e.g., 7 requests daily) with a high match score (8) who issues an access request will be assigned lesser work and easier encumbrances, e.g., T=0xx . . . x and E=1.

The above is to be read as follows.

T=0xx . . . x(hex) means that the target to be satisfied by the work lock is any number less than the number with 1 leading hex zero digits, e.g., a number with 2 leading zeroes. "E" represents an encumbrance that may be understood as a constraint. More specifically, encumbrances are stated as "n-of-m" constraints meaning that at least "n" nodes of a network of "m" nodes must verify (approve); thus E=1 means that at least one node has to approve the unlocking of the locked script.

Thus, the work lock may have the following form.

[?nonce:?input:?target:workLock|operation R]

The function workLock uses values from FIG. 7 to derive values of "T" for a given user request, i.e., values of "T" measure the importance of a user request and are used to define the amount of computational effort that is to be expended in opening the work lock.

Similarly, the encumbrance lock uses the "E" values to determine how many nodes are needed to verify a locked request. The present embodiment uses historical access data and Identity Match data, as shown in FIG. 7, represented as tables and referred to as Authorization Table to get "T" and "E" values based on a user's past usage and match data. Said data is then used to derive a work lock and an encumbrance lock for a given user request. It will be appreciated that many different kinds of historical and match data may be stored in Authorization Tables to guide in the process of contract association.

The Authorization table is part of a collection of tables that are collectively referred to as Provisioning Tables and Secondary Indexes. This collection is shown as 1000 in FIG. 2C. It is assumed to be available to all computers in TE 500 and all nodes in the EE 600 and VE 700 sub-networks.

Having explained the work lock of the locked object, it is time to explain the encumbrance lock in more detail. An "n-of-m" encumbrance, as stated earlier, represents a constraint requiring at least "n" nodes of a total of "m" nodes in the network to verify a condition. Each of the nodes of the VE network is assumed to have its own private keys. Thus, if said nodes are named A, B, C, etc., the corresponding private keys may be designated as Pri(A), Pri(B) and Pri(C). We may then specify a 2-of-3 constraint, by way of example, as follows, assuming there is a total of 3 nodes in the VE network.

[:Pri(A):Pri(B):Pri(C):2of3encVerify|operation R]

where "2of3encVerify" is assumed to be a system-provided function that returns "true" if two of its three inputs satisfy said function's constraints.

Let us now resume the discussion wherein a node of the EE sub-network 600 of FIG. 2C, having just unlocked the "verifyWork" lock, announces its success to its peers in the EE sub-network and also propagates the announcement to the nodes of the VE sub-network 700. Note, that the announcement contains the recently unlocked elements of the locked script and the remaining unlocked locks, i.e., the encumbrance lock.

Now, the nodes of the VE sub-network 700 each attempt to open the encumbrance lock. However, only node "A", "B" and "C" know their private keys. One of these nodes, say "A", provides its private key to the locked object and "internally" propagates the resulting object, i.e., to other nodes in the VE sub-network 700. Note, that the propagated object may still be unlocked, i.e., only one of its needed inputs has been supplied. (In this manner the propagation protocol for the VE sub-network 700 differs from that of EE sub-network 600 and thus forms one of the reasons why we have two different sub-networks.) Now, suppose "B" supplies its private key to the received locked object and propagates the resulting object to the other nodes of the VE sub-network 700. A node of the VE sub-network having received this newly propagated locked object, with values supplied for Pri(A) and Pri(B) now finds that it is able to open the "2of3encVerify" lock. Thus, the final lock of the locked object may be opened.

The node in the VE sub-network 700 that succeeds in this task gains the right to execute the guarded operation associated with the locked object.

The following supplemental details regarding the working of the encumbrance locks are important. A node of the VE sub-network receives a partially unlocked object. We assume that the encumbrance lock contains special software logic that when executed by a node of the VE sub-network enables it to verify the validity of the unlocked elements. For example, if a work lock has been opened, the received object must contain the "nonce", "input" and "target" values so that the opening of the work lock can be verified. Similarly, other opened locks need to be verified also. An encumbrance lock for a partially opened object verifies all previously opened locks. If such a verification fails, the opening of the encumbrance lock fails (as does the opening of the entire locked object).

Additionally, general constraints and conditions may be incorporated into the afore-mentioned special software logic that verifies specific aspects of the user, data request, etc.

One method of implementing the special software logic used by encumbrance locks for verification purposes is shown in FIG. 7, column labeled "Reference". The values of Reference are links to stored software logic that may be executed by an encumbrance lock to satisfy verifiability as discussed above. The derivation of the encumbrance lock in the general derivation of the locked object(s) takes cognizance of the reference values and incorporates the referenced software logic into the encumbrance lock(s). Thus, wide ranging conditions and constraints may be verified by encumbrance locks.

User Data Request

It is instructive to consider a specific example of a user request. For ease of description, we assume that the user request is split into two phases: user admission request (phase 1) and user data request (phase 2). The user admission request relates to efforts to authenticate the user.

FIG. 8, row 2 shows a user admission request being received. The request is received by the computers comprising TE 500 of FIG. 1C.

TE 500 transforms the admission request into a locked object with locks shown in row 3. Note that the specific values and strengths for the locks are obtained from the Authorization Table as described earlier.

In row 4 the TE computers inject the locked object "ABC" into the EE sub-network 600 FIG. 2C wherein (step 5) the locked object finds itself on the FIFO list of all nodes of the EE sub-network.

In step 6 we assume that all nodes of the EE sub-network start working on unlocking the newly added locked object "ABC", opening the locks one by one with intervening announcements, in the specified order. Furthermore, that one node succeeds first in opening all locks except the encumbrance lock. As described earlier, this enables the winning node to announce its success to all nodes of the EE and VE sub-networks.

In step 7 the VE nodes receive the partially unlocked object and proceed to unlock the remaining (encumbrance) lock. All previously opened locks need to be re-verified. The first node to succeed announces accordingly to the EE and VE sub-networks. Upon receiving the announcement, all nodes of EE and VE sub-networks update their individual logs accordingly. The second-phase of the user request may hence be invoked since the object ABC has been unlocked.

We now consider the second phase of the user request and assume that data retrievals are required in its processing. For exemplary purposes we consider the request "Who is John's banker" with respect to the database shown in FIG. 3.

Conventional database query processing systems would derive a plan for processing the above query. One such plan is shown in FIG. 9.

Row 1 of the plan shown in FIG. 9 represents the incoming request. Row 2 represents the first step of the plan, viz., get the data records comprising the table "Customer". Assuming that the table "Customer" has been split into two shards, conventional query processing systems will break down the request of row 2 in FIG. 8 into three primitive actions shown in rows 3, 4 and 5. Here the term "primitive" means actions that cannot be reduced to simpler actions by the system, i.e., actions that can be executed by the underlying methods available to the system. Rows 6, 7, 8 and 9 represent similar actions concerning the data records comprising the table "Branch".

Row 10 calls for the joining of the data records of the two tables assembled in rows 5 and 9; rows 11 and 12 call for conventional primitive actions to get the desired result.

As stated above, the plan represented in FIG. 9 is conventional and well known in prior art for processing queries such as the exemplary query shown above.

The important thing to observe in such plans is that the primitive actions comprise data access requests. Such an observation holds not only for relational database systems and SQL databases but also for object-oriented databases, no-SQL databases, etc.

The Provisioning Tables (cf. 1000, FIG. 2C) contain the schema describing the content of the database and the secondary indexes, i.e., tables that may be used by access methods to retrieve needed data, e.g., key-based tables and reverse data lookup tables, etc. The size of an incoming request may be estimated from the sizes of the secondary indexes. A brief description follows.

The operations of relational algebra may be divided into two kinds. One class operates on single relations, i.e., unary operations. Examples of such operations are the SELECT and PROJECT operations. The second kind of operations are those that operate on two or more relations, e.g., JOIN, SET DIFFERENCE, UNION, etc.

The domain of unary operations is the underlying relation so the cardinality, i.e., size, of the answer set may be estimated as an upper bound on the size of the corresponding secondary index, i.e., domain of the index. Recall that all relations are finite.

For non-unary operations, we may take the union of the underlying domains to get the upper bound on the size of the answer set. The main point is that one does not need to access the actual data to compute the size of the expected answer set.

A tenet of the present invention is that each data retrieval operation of a plan may need to be protected. Thus, we require that data records may be accessed by a data operation that is guarded by locked objects.

In some embodiments, the amount of computational work that a data request needs to perform is a function of the size of the expected answer set and the range of the value set.

Consider the table of FIG. 10 showing the target, i.e., amount of work, needed for a data retrieval operation to generate an output of a certain size. Moreover, the encumbrance column shows the number of nodes needed in the network to approve the output, i.e., one may think of them as levels of authorization or checking. For example, to generate an answer set of 500-1000 output tuples, a node attempting to generate an answer of that size needs to do an amount of work equivalent to "3-leading Hexadecimal zeroes", i.e., finding a nonce that would generate a number less than the target "000xx . . . x (hex)". Furthermore, said node's work is subject to a 4-of-N encumbrance where "N" is the total number of nodes in the network.

Transactions are different from queries in the sense that the former change, update or add data items to the database, i.e., they cause side effects. For example, a transaction may change a numeric value, e.g., account balance may be changed from $500 to $700.

The present invention uses historical data to ascertain and measure the percentage change that may be caused by a transaction. For example, FIG. 11 shows a table that may be used to compute such percentage changes to numeric values stored in the data records.

A transaction may require the addition or deletion of data records. Again, a historical record may be kept of all past such transactions, even on a per user basis, to measure the range by which said transaction differs from previous such requests. FIG. 12 shows an exemplary table of values that may be used for such a purpose.

Thus, using the tables shown in FIGS. 11 and 12, we may compute the deviation from average and the percentage change for a transaction. FIG. 10 may be used to estimate the size of the answer for a given query.

FIGS. 10, 11 and 12 may thus be used to estimate the amount of work (target for a corresponding work lock) and encumbrance needed for a given query or a transaction.

In particular, returning to the example discussed above relating to the query shown in FIG. 9, we observe that the TE computers, upon receiving the query "Who is John's banker?" may proceed by deriving the plan shown in FIG. 9 (using conventional means) and then deriving work and encumbrance locks using the historical usage data values such as shown in FIGS. 10, 11 and 12 as needed.

FIG. 13 shows such a resulting locked object in the form of a table. Note that the work and encumbrance values for the respective locks in rows 3, 4, 7 and 8 are obtained by recourse to the tables shown in FIGS. 10, 11 and 12. Thus, each of the rows 3, 4, 7, and 8 gets a locked object with the corresponding work and encumbrance locks whose general form is the same but whose individual elements may be different.

The preceding discussion has been based on describing two requests from the user that were processed sequentially. More sophisticated processing is also possible. For example, the above two sub-requests may be executed in an interleaved mode rather than a sequential mode. Such an interleaved mode of operation may also be necessitated if we unlock more than one lock concurrently.

Figure 14:
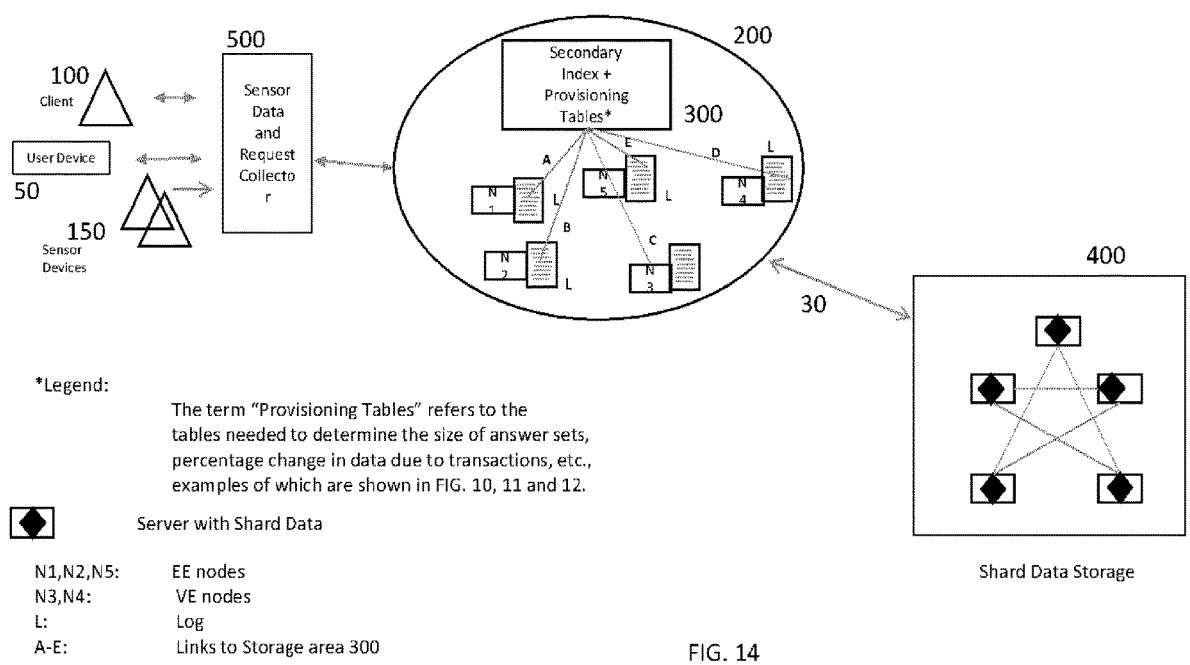
FIG. 14 depicts one example of an implementation of the network shown in FIG. 2C.

FIG. 14 depicts a physical arrangement that may be used to implement the present invention. 500 comprises one or more computers tasked with receiving sensor data from various sensor devices 150, or client (smart) devices containing sensors 100. The computers comprising 500 are also tasked with collecting user requests from user devices 50.

Furthermore, the computers comprising 500 are also tasked to act and perform the functions described by the TE computers (500, FIG. 2C). In particular, incoming user requests are analyzed to derive locked objects that are then propagated into the network 200.

A business entity may be responsible for computer systems 500 and the sensor devices (or the data from devices) such as 150. The role of this entity may then be to process incoming data and submit user requests to the network 200.

Network 200 may be a network of nodes that may be managed by a second business entity. It would be responsible for executing locked objects injected into the network and returning corresponding responses to the entity running computers 500. The network 200 may be implemented as a private, permissioned) network or a public non-permissioned network.

The network 200 contains two types of nodes, one type illustratively including node N1, N2 and N3 and the other type illustratively including nodes N4 and N5. The former group of nodes performs the functions of the EE sub-network 600 of FIG. 2C and the latter perform the functions of the VE sub-network 700. Thus, the network comprising nodes N1 through N5 is non-homogeneous. Each node has a private log file. The nodes N1-N5 in the network 200 are connected to a storage area 300 via links A-E where various secondary index tables and provisioning tables are stored. The actual data records may be stored in a distributed shard-based repository 400, access to whose servers may be cryptographically controlled.

We have discussed storing data used by system administrators in tables referred to herein as provisioning tables (1000, cf. FIG. 2C) whereas the customer data is stored in a different storage system, e.g., 800, cf. FIG. 2C. In practice the two storage systems may be integrated and the provisioning data may also be stored in the latter storage system. The idea is further strengthened by an additional security requirement that imposes invocation restrictions on operations that manipulate the system administration data also. Thus, system administration and customer data are both guarded by similar invocation restrictions.

Alternative Embodiments

Other embodiments are envisioned by the present invention. For example, a better query processing plan, in the sense that it makes more efficient use of the data stored as shards, may be derived to answer queries. Those skilled in the art will see that many kinds of plans may be derived for given queries and transactions. One idea of the present invention remains true, viz., that the data access operations within such plans are associated with locked objects that guard the entailed data operations.

An objection may be raised to the above proposal in that a node of the EE network may receive an announcement earlier than its peers and thus get a head start in opening the locks.

However, the above conjecture does not hold true. In the EE sub-network, a node that starts opening the locks will find that its computational effort is dominated by the various locks. Thus, even if a node accrues a small advantage due to network latency, it will not statistically win against all other nodes.

The present invention imposes restrictions on the invocation of certain data operations. Such restrictions may deem to slow the system down, thus, making users wait to get responses to their requests. We present an alternative embodiment to remove any delays in query processing.

Every authorized user is allocated a certain amount of digital currency, i.e., a coin, which can only be issued by authorized administrators. Nobody else can generate coins. Prior art teaches how to generate cryptocurrencies.

An authorized user is charged fees, payable in said coin, for each query or transaction posed to the database system.

The database system derives a "payment" lock that can only be paid if the requesting user has enough coins in his digital wallet. The amount of coinage needed for a query or a transaction to unlock the "payment lock" is based on user context, data context, enterprise rules, etc.

Thus, a request that is deemed to be of high "importance" (as described above) and which would have required a large amount of computational work to unlock the various locks, instead gets assigned a lock requiring a high fee in coinage. The response time thus could be kept efficient but at the expense of the user having to possess enough coins to pay the fee. Now, a malicious user will need a large amount of coinage to get his requests answered and, thus, will need to ask authorized personnel to issue him more coins. Even if he has enough coins, monitoring systems may be programmed to issue alerts for high coinage transactions.

Finally, we note (as mentioned before) that whereas the various illustrative embodiments presented so far have assumed a data storage unit based on the relational model of data, such an assumption does not limit the scope of the invention. For example, consider an embodiment in which the data storage unit stores email records (messages and meta-data) and the data operations that need to be guarded (cf. 500, FIG. 1A) are reading and storing email messages. In such an embodiment, the invocation of said data operations could be controlled by various locks that are derived in response to specific user requests. Thus, a sensor lock and a private key lock could be used to authenticate a user, a work and encumbrance lock could be used to ensure the user request is verified by multiple entities, etc.

As a final note we observe that the notion of using sensory data to derive a pattern representing user behavior and using the latter as a locking mechanism may have longer longevity than locks based on proof of work. Recall that the latter are based on the maximum number of basic operations a computer can do in a given amount of time (using current technology). Thus, one can estimate the minimum time any computer will take to unlock such a lock. As computer processing power continues to increase the amount of time needed to perform the computations necessary to unlock a lock based proof of work will decrease.

On the other hand, sensor data based locks of the type also described herein depend only on user behavior and are thus immune to computational advances. It is the user and his actions that determine the unlocking of a lock, not the speed of the computer. Moreover, since proof of work locks and sensor data based locks operate on fundamentally different principles, the use of both types to secure data in databases is complementary.

Illustrative Computing Environment

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . .). However, computer readable storage media do not include transitory forms of storage such as propagating signals, for example. Of course, those skilled in the art will recognize many modifications may be made to this configuration without departing from the scope or spirit of the claimed subject matter.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

The invention claimed is:

1. A method for accessing stored data, comprising:
receiving a request to access data stored in a data storage unit, the request requiring one or more data operations to be performed by a system having access to the stored data;
responsive to the data request, deriving and assigning one or more locks to one or more of the data operations, each of the locks controlling invocation of the data operations to which the respective lock is assigned, the one or more locks including a verifiable work lock that requires one or more computational tasks to be performed in order to be unlocked, wherein the verifiable work lock is configured to be verifiable by a proof of work process, the one or more locks further including an encumbrance lock, the encumbrance lock being unlocked by verifying that all locks have been opened correctly;
the deriving based in part on (i) user context data obtained from a user issuing the request and (ii) data context comprising one or more attributes of the request;
unlocking each of the one or more locks; and
invoking the one or more data operations after the one or more locks are unlocked.

2. The method of claim 1, wherein at least one of the computational tasks includes finding a nonce such that, when appended to a predetermined input value, serves as an input to a computationally irreversible function that produces a predefined target output value.

3. The method of claim 1, wherein the one or more locks includes one or more sensor locks, at least one of the sensor locks being an authentication lock for authenticating the user issuing the request, wherein the authentication lock is unlocked by matching a prescribed set of environmental data obtained from a smart device from which the user issues the request to a previously obtained set of environmental template data.

4. The method of claim 3, wherein the match between the prescribed set of environmental data and the environmental template data is only sufficient to unlock the authorization lock if the match exceeds a specified confidence level.

5. The method of claim 3, wherein the prescribed set of environmental data represents a pattern of behavior of the user.

6. The method of claim 5, wherein the prescribed set of environmental data is obtained on a rolling basis over a period of time prior to the issue of the request by the user from the smart device.

7. The method of claim 5, wherein the environmental template data is obtained over a prescribed period of time.

8. The method of claim 1, wherein verifying that the one or more computational tasks associated with the work lock have been performed includes verifying in a prescribed manner that the one or more computational tasks associated with the work lock have been performed, the prescribed manner being based at least in part on the user context data obtained from the user issuing the request and/or the one or more attributes of the request.

9. The method of claim 8, wherein verifying in the prescribed manner includes requiring a specified number of network nodes to independently verify that the one or more computational tasks have been performed.

10. The method of claim 1, wherein the unlocking and verifying are performed by a network of computing nodes, the computing nodes performing the one or more computational tasks being different from the computing nodes verifying that the one or more computational tasks associated with the work lock have been performed.

11. The method of claim 1, wherein the one or more locks includes a private key lock for authenticating the user issuing the request.

12. The method of claim 1, wherein a strength of the work lock is based at least in part on a nature of the data request, an expected size of an answer set that is responsive to the request and a magnitude of change to the stored data arising from executing the one or more data operations.

13. The method of claim 1, wherein a strength of the encumbrance lock is based at least in part on system policy, an expected size of the answer set that is responsive to the request and a magnitude of change to the stored data arising from executing the one or more data operations.

14. The method of claim 3, where a strength of the sensor lock is determined based at least in part by a rule derived from user behavior and networking and smart device context.

15. The method of claim 11, wherein a strength of the private key lock is based at least in part on a corresponding public key of the user issuing the request.

16. The method of claim 1, wherein the one or more attributes of the request are selected from the group consisting of a nature of the request, an expected size of an answer set that is responsive to the request and a magnitude of change to the stored data arising from satisfying the request.

17. The method of claim 1, wherein the user context data includes sensor data obtained from sensors incorporated in or associated with a smart device of the user from which the request is issued.

18. The method of claim 1, wherein the data operations are primitive data operations and further comprising transforming the request into a plurality of primitive data operations.

19. The method of claim 1, wherein at least two of the data operations are assigned different locks.

20. The method of claim 1, wherein the one or more locks includes a payment lock that requires the user to pay a fee with digital currency to unlock the payment lock, wherein an amounted of digital currency needed to be paid to unlock the payment lock increases as a strength of the payment lock increases.

21. The method of claim 20, wherein the strength of the payment lock is based at least in part on the user context data.

22. The method of claim 1, wherein the deriving is further based in part on historical usage data of the user and/or other users of the system.

23. The method of claim 1, wherein each of the locks controlling invocation of the data operations to which the respective lock is assigned prevents invocation of the data operations to which the respective lock is assigned unless and until the respective lock is unlocked.

24. The method of claim 1, wherein the deriving is further based in part on administrative provisioning data.

25. The method of claim 23, wherein deriving the locks includes deriving a plurality of locks and specifying an order in which the locks are to be unlocked, wherein unlocking each of the locks includes unlocking the locks in accordance with the order imposed by the derived locks.

\* \* \* \* \*